Feb. 4, 1969      W. E. BRAESE      3,425,150
SECTIONAL FISH-POLE CARRIER CLIPS
Filed Aug. 4, 1967
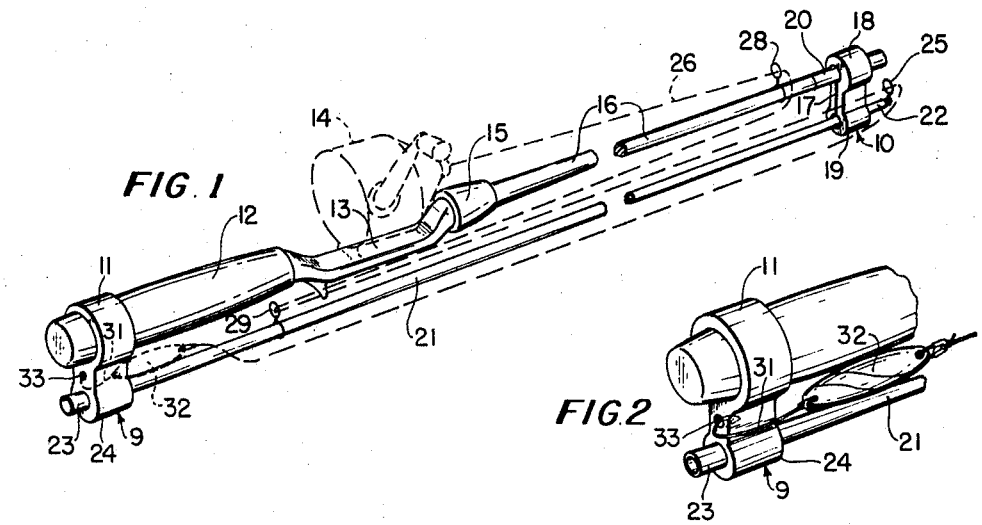
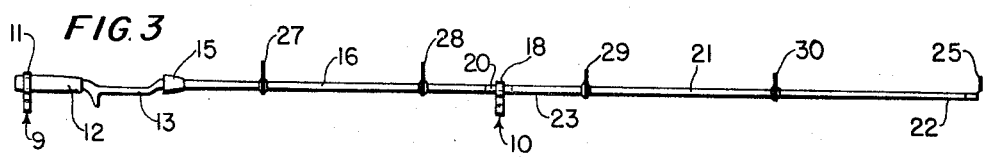
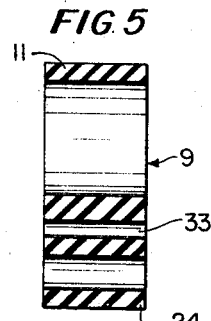 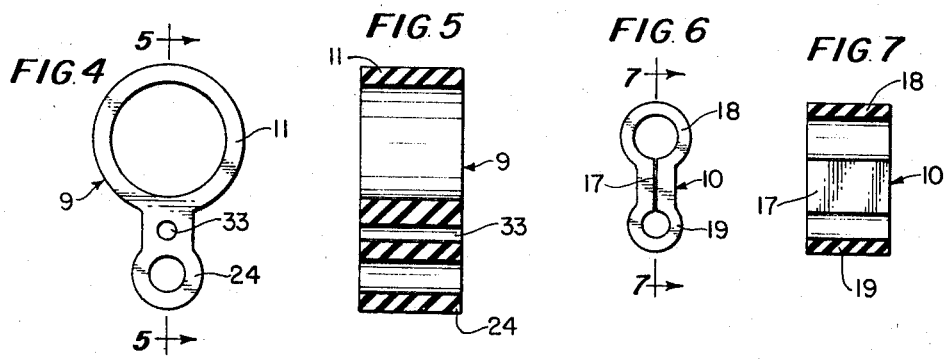 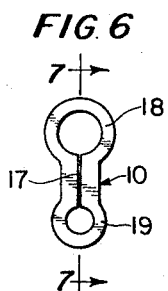 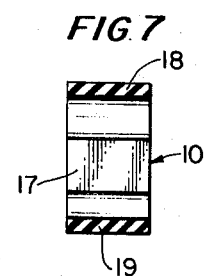
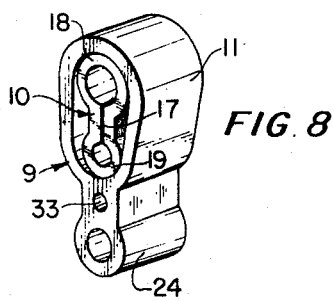
INVENTOR:
WILLIAM E. BRAESE

United States Patent Office 3,425,150
Patented Feb. 4, 1969

3,425,150
SECTIONAL FISH-POLE CARRIER CLIPS
William E. Braese, Airport Road,
Dyersburg, Tenn. 38024
Filed Aug. 4, 1967, Ser. No. 658,455
U.S. Cl. 43—25.2          7 Claims
Int. Cl. A01k 87/00

ABSTRACT OF THE DISCLOSURE

Two carrier clips made of molded rubber or other resilient material have sleeve portions applicable to opposite ends of the handle section of a two-section casting rod and additional parallel sleeve portions designed to have the other section of the rod when detached from the handle section slipped thereinto at opposite ends. The clip at one end of the handle section being split lengthwise so that the eye on the tip of the other section can be slipped through the clip readily. The clip of the other end of the handle section has a through bore for receiving the fishhook of a line attached fish lure. The large sleeve portion on the one clip that is adapted to fit snugly over the handle on the rod is also large enough in relation to the handle on the rod is also large enough in relation to serted in this sleeve portion for compactness in storage.

---

This invention relates to sectional fish-pole carrier clips designed to enable carrying a sectional fishpole in disassembled condition, but with the line therein ready for almost immediate use when the sections are assembled together again, the clips insuring safe and secure carrying of the fish lure with its hook detachably secured in a hole provided in one of the clips. The clips are further designed with a view to enabling leaving both of them on one section of the pole during fishing, and they are also designed to facilitate compact packing of one clip inside the other to take up minimum space in a bait box or in the owner's pocket when not in use.

A further object is to provide clips of the kind mentioned which may be economically molded of rubber or other resilient plastic material, thus making the item available at relatively low cost and also insuring maximum durability to withstand rough usage.

The invention is illustrated in the accompanying drawing, in which:

FIG. 1 shows a sectional fish-pole in disassembled form with intermediate portions of both sections broken away to save space in the drawing and enable showing the parts on a larger scale, the sections being shown held together neatly in close parallel relationship by means of the carrier clips of my invention, there being also shown in dotted lines the fishing reel and its line extending through the guides on the two sections with the fish lure hook engaged in the hole in one clip, as better seen on a larger scale in FIG. 2, to enable quickly reassembling the pole for immediate resumption of fishing while yet keeping the parts safely and securely held together for convenient carrying indefinitely, or even storage of the pole in this condition, if so desired;

FIG. 3 is a view of the fish-pole in assembled condition, but omitting the reel and line, the purpose of this view being mainly to illustrate how the two clips may be left on the pole during fishing, as there is nothing about them to interfere with normal use of the pole;

FIG. 4 is a rear view of the larger of the two clips shown substantially full size;

FIG. 5 is a cross-section on the line 5—5 of FIG. 4;

FIG. 6 is a rear view of the smaller one of the two clips shown substantially full size;

FIG. 7 is a cross-section on the line 7—7 of FIG. 6, and

FIG. 8 is a perspective view showing how the two clips may be nested together for safe keeping as the nesting reduces liklihood of either of the clips being mislaid or lost when the clips are to be kept in a bait box or carried in the owner's pocket.

The same reference numerals are applied to corresponding parts throughout the views.

Referring to the drawing, the reference numeral 9 designates the larger one of the two clips, and the reference numeral 10 designates the smaller one of the two clips of my invention, both being preferably molded of rubber or other resilient plastic material, for economy and durability. The large loop 11 on clip 9 is large enough to fit snugly on the butt end of the handle 12 of a sectional fish-pole such as is commonly used for casting, the same having a reel mounting portion 13 to carry a conventional fishing reel like that indicated in dotted lines at 14 in FIG. 1, secured in the usual way by means of a slidable sleeve 15 on the handle end of the main section 16 of the fish-pole in the usual way. The smaller clip 10, which is split lengthwise, as indicated at 17, between the sleeve portions 18 and 19 at opposite ends, is adapted to fit snugly on the ferrule 20 on the outer end of the main section 16 of the fish-pole, into which the butt end of the other section 21 of the fish-pole is insertable. The latter is of smaller diameter at its outer end 22 than at its inner or butt end 23, and there is accordingly a slightly larger sleeve portion 24 on the other end of the larger clip 9 to accommodate the butt end 23 of pole section 21, while the outer end 22 is engageable in the slightly smaller sleeve portion 19 on the corresponding end of the smaller clip 10. The sleeve portion 18 on the other end of clip 10 is larger than sleeve portion 19 and about the same size as the sleeve portion 24 on clip 9, being designed to fit on ferrule 20 which accommodates the inner end 23 of the outer pole section 21. The split 17 in clip 10 permits slipping the guide 25 on the tip end of the outer section 21 through the sleeve 19 when the pole is disassembled and the opposite ends of section 21 are being entered in the sleeve portions 19 and 24 of the two clips, and likewise when section 21 is thereafter removed again from the clips to be reassembled on the section 16. Sleeve 11 on clip 9 is large enough to accommodate clip 10 therein, as seen in FIG. 8, whenever the clips are to be stored in a bait box or carried in the user's pocket. This feature is also of advantage in the packaging of the article for sale and in shipping.

In operation, the clips 9 and 10 may be carried in the user's pocket when not in use and then they are preferably nested as seen in FIG. 8 so as to take up minimum space. On the other hand, clip 9 may be left on the handle 12 and clip 10 on the ferrule 20 on the outer end of section 16, as seen in FIG. 3, when the pole is in use, as they are small enough to be virtually unnoticeable and they fit tightly enough to stay securely in a given position. Clip 10 projects downwardly from section 16 and is, therefore, out of the way so far as the line 26 is concerned, which extends from the reel 14 through the eyes or guides 27–30 to the end eye or guide 25, previously mentioned. When fishing is to be temporarily suspended at one spot to be reassumed later at another, in which case the user would prefer to keep the reel and line and the lure as well ready for use promptly, and yet have the convenience of carrying the pole safely in disassembled form as shown in FIG. 1, using the clips 9 and 10 to their full advantage, that can be done by having the line 26 extend, as shown in FIG. 1, rearwardly from guide 28 to guide 29 and then forwardly through guides 29 and 30 and guide 25, and finally rearwardly from guide 25 to the vicinity of clip 9, where the hook 31 on fish lure 32 is engaged in the hole 33 provided in the clip 9 between the two sleeve portions 11 and 24, as shown. By having this hole 33 extend all the way through the clip 9 it is immaterial which way the clip 9 faces when applied to the handle 12. Any slack in the line 26 can, of course, be taken up by tightening the reel 14 so that there will be no danger whatsoever of the hook 31 becoming disengaged from the hole 33 in clip 9. Hence, the user is assured of keeping all of the parts safely and securely held together for convenience in carrying for as long as that may be necessary, or even storage of the pole in this condition, if desired. Yet the parts are kept in such a relationship that it is not at all difficult to get the pole reassembled quickly to resume fishing, in which event the tension on the line 26 is released to permit disengaging the hook 31 from hole 33 in clip 9, after which the section 21 is slipped forward out of clip 9 and then rearwardly out of clip 10, the projecting guide or eye 25 passing easily through the slit portion 17 of clip 10.

It is believed the foregoing description conveys a good understanding of the objects and advantages of my invention. The appended claims have been drawn to cover all legitimate modifications and adaptations.

I claim:

1. For use in clamping in substantial parallel side-by-side relation, a pair of fish-pole sections that normally are fixed one ao another in end to end relation, a pair of clips of flexible resilient material, each providing a pair of spaced substantially parallel sleeve portions, the expansibility of these sleeve portions being such as to accommodaote themselves to the size and shape of those portions of the fish-pole sections entered therein, said sleeve portions being adapted to telescope on the opposite end portions of the two fish-pole sections and grip the same resiliently, one of the two clips being split substantially radially from the one sleeve portion toward the other sleeve portion for passage therethrough of a radially projecting fish-line guide on that end of one of said fish-pole sections, and the other of said clips having a receptacle provided therein between the two sleeve portions to receive the sharp end of a fish hook on a line on said pole.

2. A structure as set forth in claim 1, wherein the splitting of the one clip extends all the way from one sleeve portion to the other.

3. A structure as set forth in claim 1, wherein the receptacle for the sharp end of the fish-hook is in the form of a hole extending through the clip substantially parallel with the bores of the two sleeve portions, whereby to enable having the clip face in either direction when applied to the fish-pole section.

4. A structure as set forth in claim 1, wherein one of said clips is substantially larger than the other and has one of the sleeve portions thereof substantially larger than the other sleeve portions to accommodate the handle end of one of the fish-pole sections, this sleeve portion when stretched to oblong form accommodating the full length of the other clip therein, whereby the two clips form a single assembly with the smaller clip resiliently gripped in the one sleeve portion of the larger clip.

5. In combination with a two-sectoin fish-pole, the sections of which are detachably interconnectable telescopically at one end, each of said sections having projecting radially from one side thereof aligned fish-line guides, a pair of carrier clips of flexible resilient material, each having two sleeve portions in parallel relationship, one of said clips having one of its sleeve portions telescoped on the handle end of one of the two pole sections, the other of said clips having one of its sleeve portions telescoped on the other end of the same section with its other sleeve portion projecting from said pole section in the opposite direction from the aforementioned fish-line guides, whereby to avoid interference with a fish line extending through the aligned guides on the two pole sections when the fish pole is in use, the other pole section when disconnected from the handle section being insertable at its opposite ends in the other sleeve portions of the two clips, the clip remote from the handle end being split radially from the sleeve portion that receives the outer end of the other pole section toward the other sleeve portion to permit slipping a radially projecting fish-line guide on the outer end of said other pole section therethrough in mounting said fish-pole section in the two clips and later removing the same therefrom.

6. The combination as set forth in claim 5, wherein the clip on the handle end of the handle section has a fish hook receptacle provided therein in that side remote from the other clip in which to engage the sharp end of a fish-hook on the line on said pole when the fish-pole is disassembled with the reel and line left thereon, while the two sections are mounted in the two clips.

7. The combination as set forth in claim 6, wherein the fish-hook receptacle comprises a hole extending all the way through said clip substantially parallel to the bores of the two sleeve portions, whereby to enable use of the clip facing either way when assembled on the handle end of the handle section of the fish-pole.

References Cited

UNITED STATES PATENTS

| | | | |
|---|---|---|---|
| 2,556,403 | 6/1951 | Sokolik | 43—25.2 X |
| 2,878,610 | 3/1959 | Herstedt | 43—25.2 |
| 3,113,363 | 12/1963 | Fyvie | 43—25 X |
| 3,169,290 | 2/1965 | Snodgrass | 43—25 X |

WARNER H. CAMP, *Primary Examiner.*